United States Patent
Lee et al.

(10) Patent No.: US 10,145,527 B2
(45) Date of Patent: Dec. 4, 2018

(54) LASER CAR LAMP AND NIGHT VISION SYSTEM USING THE SAME

(71) Applicant: National Taiwan University of Science and Technology, Taipei (TW)

(72) Inventors: Tsung-Xian Lee, Taipei (TW); Ching-Chia Chou, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 15/859,706

(22) Filed: Jan. 1, 2018

(65) Prior Publication Data
US 2018/0142853 A1 May 24, 2018

Related U.S. Application Data

(63) Continuation-in-part of application No. 15/472,258, filed on Mar. 28, 2017.

(30) Foreign Application Priority Data

Oct. 13, 2016 (TW) .............................. 105133126 A
Sep. 7, 2017 (TW) .............................. 106130702 A

(51) Int. Cl.
*F21V 11/00* (2015.01)
*F21S 41/16* (2018.01)
(Continued)

(52) U.S. Cl.
CPC ............... *F21S 41/16* (2018.01); *F21S 41/13* (2018.01); *F21S 41/141* (2018.01);
(Continued)

(58) Field of Classification Search
CPC .......... F21S 41/16; F21S 41/24; F21S 41/255; G02B 19/0052; F21Y 2115/30
See application file for complete search history.

(56) References Cited

U.S. PATENT DOCUMENTS 4,707,595 A 11/1987 Meyers
7,862,216 B2 1/2011 Friedrichs et al.
(Continued)

FOREIGN PATENT DOCUMENTS

CN 102121651 A 7/2011
CN 104160208 A 11/2014
(Continued)

OTHER PUBLICATIONS

K. A. Denault et al., "Efficient and stable laser-driven white lighting", AIP Advances 3, 072107 (2013), Jul. 10, 2013.
(Continued)

*Primary Examiner* — Evan Dzierzynski
(74) *Attorney, Agent, or Firm* — CKC & Partners Co., Ltd.

(57) ABSTRACT

A laser car lamp includes a light guide element, a phosphor element, a first laser diode, a second laser diode, a lens, and a reflector. The light guide element has first and second surfaces opposite to each other. The phosphor element and the lens are disposed at two opposite ends of the light guide element. The reflector is configured to reflect the first laser beam generated by the first laser diode and reflect the second laser beam generated by the second laser diode to the first surface. The first laser beam is scattered by the phosphor element to form a first scattered light, the second laser beam is excited and scattered by the phosphor element to form a second scattered light. The mixed light beam including the first scattered light beam and the second scattered light beam is emitted from the first surface toward the lens.

10 Claims, 14 Drawing Sheets

(51) Int. Cl.
*F21S 41/141* (2018.01)
*F21S 41/25* (2018.01)
*F21S 41/67* (2018.01)
*F21S 41/30* (2018.01)
*G02B 19/00* (2006.01)
*F21S 41/13* (2018.01)
*F21S 41/24* (2018.01)
*F21S 41/255* (2018.01)
*F21S 41/176* (2018.01)
*F21Y 115/10* (2016.01)
*F21Y 115/30* (2016.01)
*F21S 41/37* (2018.01)
*F21S 45/47* (2018.01)

(52) U.S. Cl.
CPC ............ *F21S 41/176* (2018.01); *F21S 41/24* (2018.01); *F21S 41/25* (2018.01); *F21S 41/255* (2018.01); *F21S 41/30* (2018.01); *F21S 41/67* (2018.01); *G02B 19/0052* (2013.01); *F21S 41/37* (2018.01); *F21S 45/47* (2018.01); *F21Y 2115/10* (2016.08); *F21Y 2115/30* (2016.08)

(56) References Cited

U.S. PATENT DOCUMENTS

| | | | |
|---|---|---|---|
| 9,164,367 | B2 | 10/2015 | Chang et al. |
| 9,377,169 | B2 | 6/2016 | Suckling et al. |
| 2009/0067194 | A1 | 3/2009 | Sanchez |
| 2013/0039029 | A1 | 2/2013 | Wang et al. |
| 2013/0294103 | A1 | 11/2013 | Li et al. |
| 2014/0078717 | A1 | 3/2014 | Takahashi et al. |
| 2014/0168940 | A1 | 6/2014 | Shiomi et al. |
| 2015/0191115 | A1* | 7/2015 | Yamamura .......... F21S 48/1731 315/82 |
| 2015/0354761 | A1* | 12/2015 | Nagao .................... F21S 41/16 362/510 |
| 2015/0357790 | A1* | 12/2015 | Jeoung .................... F21V 5/04 372/32 |
| 2017/0082263 | A1* | 3/2017 | Byrnes .................... F21V 5/045 |
| 2018/0252379 | A1* | 9/2018 | Zozgornik ........... G02B 6/0001 |

FOREIGN PATENT DOCUMENTS

| | | |
|---|---|---|
| TW | 200846699 A | 12/2008 |
| TW | I332069 B | 10/2010 |
| TW | I338637 B | 3/2011 |
| TW | 201246734 A | 11/2012 |
| TW | I388773 B1 | 3/2013 |
| TW | M490548 U | 11/2014 |

OTHER PUBLICATIONS

C. Basu et al., "A High Power Blue Diode Laser Pumped White Light Source Using Remote Phosphors", ISAL 2013 Proceedings, Sep. 24, 2013.

U. Hartwig, "Fiber optic illumination by laser activated remote phosphor", Nonimaging Optics: Efficient Design for Illumination and Solar Concentration IX, Proc. of SPIE vol. 8485, Oct. 11, 2012.

T. X. Lee et al., "Novel remote phosphor design for laser based white lighting application", Fifteenth International onference on Solid State Lighting and LED-based Illumination Systems, Proc. of SPIE vol. 9954, Sep. 2016.

* cited by examiner

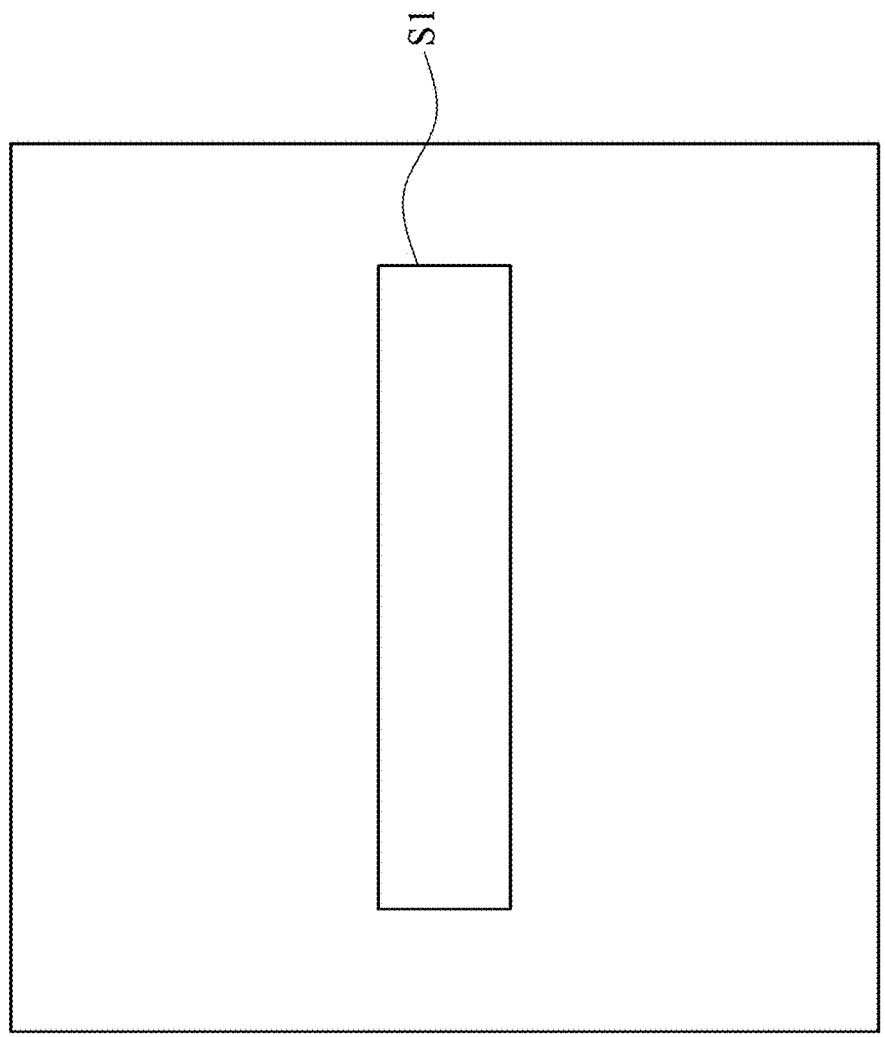

US 10,145,527 B2

LASER CAR LAMP AND NIGHT VISION SYSTEM USING THE SAME

RELATED APPLICATIONS

The present application is a Continuation-in-part of the U.S. application Ser. No. 15/472,258, filed Mar. 28, 2017, which claims priority to Taiwan Application Serial Number 105133126, filed Oct. 13, 2016, all of which are herein incorporated by reference. The present application claims priority to Taiwan Application Serial Number 106130702, filed Sep. 7, 2017, which is herein incorporated by reference.

BACKGROUND

Field of Invention

The present invention relates to a car lamp. More particularly, the present invention relates to a laser car lamp and night vision system using the same.

Description of Related Art

In recent years, due to vigorous development of image processing and sensor technology, in addition to the needs of white lighting, instruments made using infrared light as light sources are also applied to many industries. One important application is the development of a night vision auxiliary system to assist the hampering of human vision while driving at night.

With the progress of technology, the brightness and quality of manmade light is also increasing. The development of the headlight began with the kerosene lamp, and further to the halogen lamp, the xenon headlamp and the light emitting diode (LED). LEDs are now widely used in lighting. Compared to traditional incandescent or fluorescent tubes, LEDs provide higher efficiency and longer service lifetime. However, in the high-power automotive lighting field, LED lights still have lots of difficulties and restrictions.

At present, the night light auxiliary system can be divided into two kinds. The first kind uses far infrared lights, which can sense images with temperature higher than ambient temperature, and sense higher temperatures at remote regions. The effective sensing distance is about 300 meters, which is not affected by other light sources. However, it would be incapable of sensing if the object temperature is approximately the same as that of the ambient temperature. The second kind uses near infrared lights, which are free from limitations of heat sources, and the effective sensing distance can achieve approximately 200 meters.

Even so, there are still considerable spaces for improvements and technological breakthroughs regarding applications of infrared lights in the car lamp lighting and night vision system applications.

SUMMARY

In view of the above, some embodiments of the present invention disclose a laser car lamp and a night vision system using the same, providing both high efficiency white light and infrared illumination without increasing production cost and/or volume.

One aspect of the present invention discloses a laser car lamp comprising a light guide element, at least one phosphor element, at least one first laser diode, at least one second laser diode, a lens and at least one reflector. The light guide element has a first surface and a second surface opposite to each other. The phosphor element is disposed at an end of the second surface of the light guide element. The lens is disposed at an end of the first surface of the light guide element. The reflector is configured to reflect the first laser beam generated by the first laser diode and reflect the second laser beam generated by the second laser diode to the first surface. The first laser beam is scattered by the phosphor element to form a first scattered light beam, the second laser beam is excited and scattered by the phosphor element to form a second scattered light, and a mixed beam including the first scattered light beam and the second scattered light beam is emitted from the first surface toward the lens.

According to some embodiments of the present invention, the first laser beam is a near infrared laser beam, and the second laser beam is a blue laser beam.

According to some embodiments of the present invention, the light guide element has a first light guide portion and a second light guide portion connected with each other. The first surface is located at the first light guide portion, and the second surface is located at the second light guide portion.

According to some embodiments of the present invention, the cross-sectional area of the first light guide portion is reduced from the first surface toward the second surface.

According to some embodiments of the present invention, the cross-sectional area of the second light guide portion is reduced from a direction of the first surface toward the second surface.

According to some embodiments of the present invention, a reduced amount per unit distance of the cross-sectional area of the first light guide portion along the direction is greater than a reduced amount per unit distance of the cross-sectional area of the second light guide portion along the direction.

According to some embodiments of the present invention, the first surface has at least one inner-concave structure, and the shape of the first surface is an inclined-step.

According to some embodiments of the present invention, the second surface comprises a plurality of second sub-surfaces arranged in an array and isolated from each other. The first surface comprises a plurality of first sub-surfaces adjacent to each other and arranged in an array. The second sub-surfaces correspond to each of the first sub-surfaces respectively. The number of the first laser diodes and the second laser diodes are plural. The plurality of first sub-surfaces correspond to the plurality of first laser diodes and the plurality of second laser diodes.

According to some embodiments of the present invention, the phosphor element comprises a phosphor powder layer and a reflecting layer.

Another aspect of the present invention discloses a night vision system, comprising said laser car lamp, at least one light receiving element, an image processing element, and a display. The image processing element is electrically connected to the light receiving element. The display is electrically connected to the image processing element. The light receiving element receive the reflected light, which is reflected back to the night vision system after the mixed light beam emitting out from the lens, and the reflected light is then converted into a plurality of electrical signals by the light receiving element. The image processing element processes the electrical signals and transmits the electrical signals to the display to produce an image.

Some embodiments of the present invention mentioned above generate a mixed light beam which mixes near infrared beams and white light beams by using the first laser diodes which emit near infrared beams, the second laser diodes which emit blue laser beams, the light guide element, and the phosphor element. This kind of mixed light beams are used in the illumination of car lamps to achieve both the remote detection by infrared light and the visible lighting effect for human eyes by visible lights without any need to add optical components, thus reducing the size of laser car lamps and saving cost.

It is to be understood that both the foregoing general description and the following detailed description are by example, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2C is a schematic diagram of beam shape projection on a screen with a distance 25 meters from the lens after the mixed light beam of the laser car lamp is emitting out from the lens according to the embodiment illustrated in FIGS. 2A and 2B;

DETAILED DESCRIPTION

Figure 1:
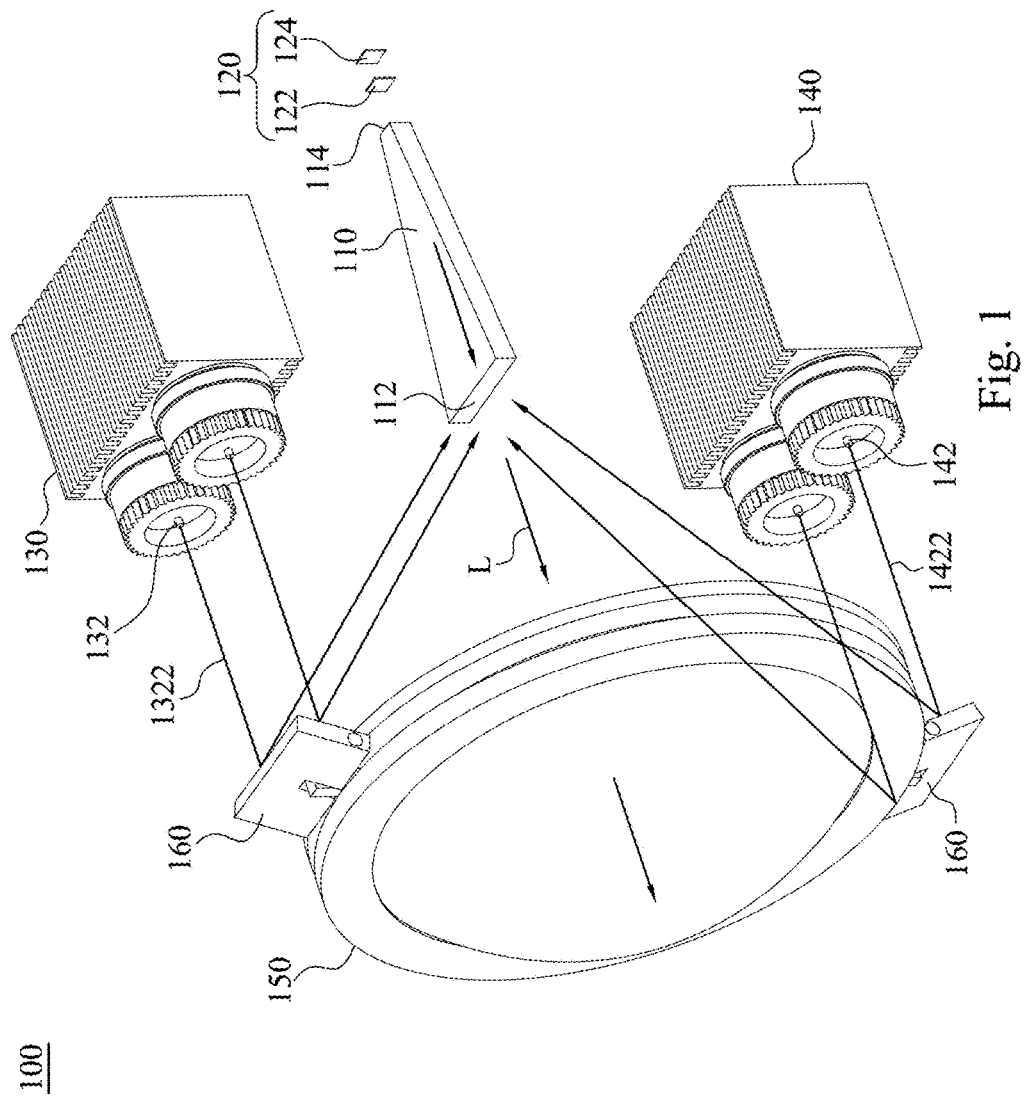
FIG. 1 is a schematic diagram of a laser car lamp according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Referring to FIG. 1. FIG. 1 is a schematic diagram of a laser car lamp 100 according to one embodiment of the present invention. In the present embodiment, the laser car lamp 100 comprises a light guide element 110, at least one phosphor element 120, a first light source 130 comprising at least one first laser diode 132, a second light source 140 comprising at least one second laser diode, a lens 150, and at least one reflector 160.

The material used in the light guide element 110 can be a solid glass, such as BK7 (with refractive index equal to 1.5168), but not limited thereto. The light guide element 110 has a first surface 112 and a second surface 114 opposite to each other. The first surface 112 is a light entrance surface of the first laser beam 1322 generated by the first laser diode 132 and the second laser beam 1422 generated by the second laser diode 142, and the first surface 112 also serves as a light exit surface of the mixed light beam L. An anti-reflective coating (AR) can be optionally coated on the first surface 112 and the second surface 114 to decrease the reflection of the first laser beam 1322 and the second laser beam 1422, so as to increase the light transmittance. The phosphor element 120 is disposed at an end of the second surface 114 of the light guide element 110, and the disposition can be done by adherence, but is not limited thereto.

The phosphor element 120 can be constituted by a phosphor powder layer 122 and a reflecting layer 124. Specifically, the phosphor powder layer 122 can be adhered to or covering the second surface 114, and the reflecting layer 124 can be adhered to or covering the phosphor powder layer 122. Thus, when the first laser beam 1322 or the second laser beam 1422 hits the phosphor element 120, the phosphor powder layer 122 may be used to scatter or to excite and scatter the laser beams such that the laser beams return from the second surface 114 to the first surface 112. The disposition of the reflecting layer 124 can increase the utilization of laser beams on car lamps. The material of the phosphor powder layer 122 on the phosphor element 120 can be yellow phosphor powder. Other kinds of phosphor powders chosen to fit colors needed for car lamps, the first laser beam 1322 generated by the first laser diode 132, or the second laser beam 1422 generated by the second laser diode 142 will not depart from the spirit and scope of the present invention.

In the present embodiment, the first laser beam 1322 is, for example, a near infrared laser beam, and the second laser beam 1422 is, for example, a blue laser beam. In the subsequent discussion herein, reference will also be made to the embodiments in which the first laser beam 1322 and the second laser beam 1422 are both near-infrared light-emitting beams or blue laser beams. In various embodiment of the present invention, the first laser diode 132 can generate a plurality of first laser beams 1322, and the second laser diode 142 can generated a plurality of second laser beams 1422. In addition, the first laser diode 132 and the second laser diode 142 may also be laser diodes of arbitrary wavelength as desired for practical applications, which does not depart from the spirit and scope of the present invention.

The lens 150 is disposed at one end of the first surface 112 of the light guide element, and the distance between the lens 150 and the first surface 112 can be adjusted according to practical applications. The reflector 160 is configured to reflect the first laser beam 1322 generated by the first laser diode 132 and reflect the second laser beam 1422 generated by the second laser diode 142 to the first surface 112. In the present embodiment, the reflector 160 is disposed, for example, on the outer edge of the lens 150. However, it is not limited in other embodiments. The reflector 160 may be disposed at any position within the laser car lamp 100 according to practical applications or space limitations.

Under the arrangement of the present embodiment, the first laser beam 1322 generated by the first laser diode 132 and the second laser beam 1422 generated by the second laser diode 142 are reflected by the reflector 160 and enter the light guide element 110 through the first surface 112. The light guide element 110 is designed to totally reflect the incident first laser beam 1322 and the incident second laser beam 1422. As a result, the first laser beam 1322 and the second laser beam 1422 may illuminate the phosphor element 120 starting from the first surface 112 to the second surface 114 via a plurality of total reflections within the light guide element 110.

Following the above paragraph, since the first laser beam 1322 of the present embodiment is exemplified by a near-infrared laser beam and the phosphor powder layer 122 on the phosphor element 120 can scatter near-infrared laser beams, the first laser beam 1322 is thus scattered by the phosphor element 120 to form a first scattered light beam, and the first scattered light beam is directed toward the first surface 112 from the second surface 114 via multiple times of total reflections in the light guide element 110. In addition, since the second laser beam 1422 of the present embodiment is exemplified by a blue laser beam and the phosphor powders on the phosphor element 120 (exemplified by the yellow phosphor in the present embodiment) can be excited to generate yellow lights by the blue laser, the yellow and blue light complement with each other to generate white light. Thus, the second laser beam 1422 is excited and scattered by the fluorescent light beam 120 to form a second scattered light beam exhibiting white light, and the second scattered light beam is advanced from the second surface 114 to the first surface 112 via multiple times of total reflections in the light guide element 110.

Following the above paragraph, in the light guide element 110, the first scattered light beam and the second scattered light beam form a mixed light beam L. The mixed light beam L leaves the first surface 112 and travels towards the lens 150 and is emitted outside of the car through the lens 150 to form a car lamp illumination light source.

Figure 2A:
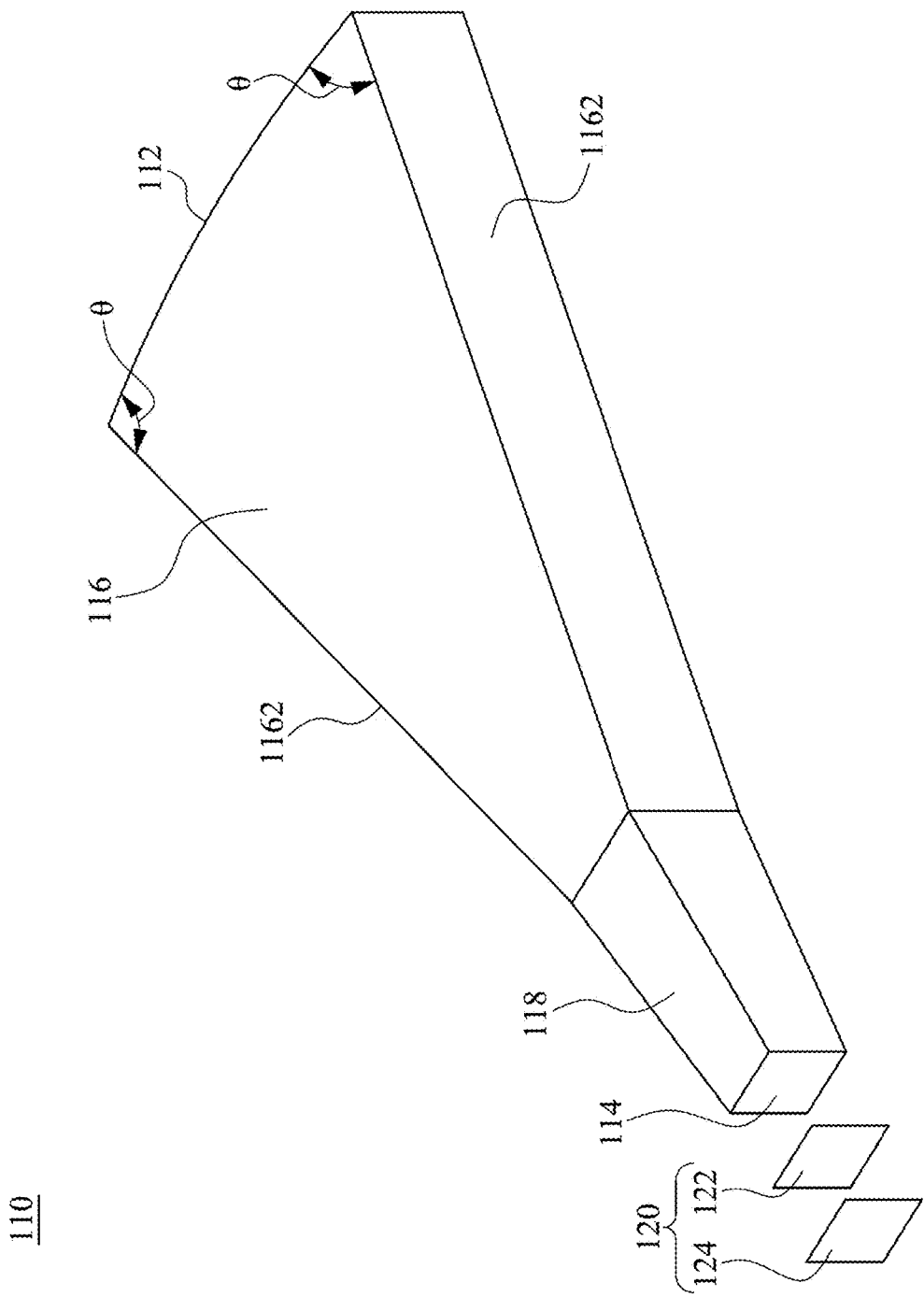
FIG. 2A is a schematic diagram of a light guide element of a laser car lamp according to one embodiment of the present invention.

Referring to FIG. 2A. FIG. 2A is a schematic diagram of a light guide element 110 of a laser car lamp 100 according to one embodiment of the present invention. The light guide element 110 of the laser car lamp 100 in the present embodiment has a first light guide portion 116 and a second light guide portion 118 connected with each other. The first surface 112 is located at the first light guide portion 116, and the second surface 114 is located at the second light guide portion 118. In the present embodiment, the first light guide portion 116 and the second light guide portion 118 are used to facilitate total reflections while the first laser beam 1322 and the second laser beam 1422 is advancing within the first light guide portion 116 and the second light guide portion 118. In addition, the side surface 1162 of the first light guide portion 116 is disposed to have an angle θ smaller than 90 degrees with respect to the first surface 112, such that the cross-sectional area of the first light guide portion 116 is reduced from the first surface 112 toward the second surface 114. The characteristic structure of the reduced cross-sectional area can not only enhance light receiving and exiting efficiency, but also decrease astigmatism of the mixed light beam L while exiting, such that the shape of light is maintained to be the shape of the first surface 112.

In other embodiments, the cross-sectional area of the second light guide portion 118 is optionally reduced from the direction of the first surface 112 toward the second surface 114. It is worth mentioning that in the embodiment that the second light guide portion 118 is the said reduced structure, a reduced amount per unit distance of the cross-sectional area of the first light guide portion 116 along the direction of reduction is greater than a reduced amount per unit distance of the cross-sectional area of the second light guide portion 118 along the direction of reduction, so as to enhance the light receiving and light exiting efficiency.

Besides, in some embodiments, the light guide element 110 as illustrated in FIG. 2A may have the effective illumination or detection distance of the laser car lamp 100 up to 550 m, which is longer than conventional techniques.

Figure 2B:
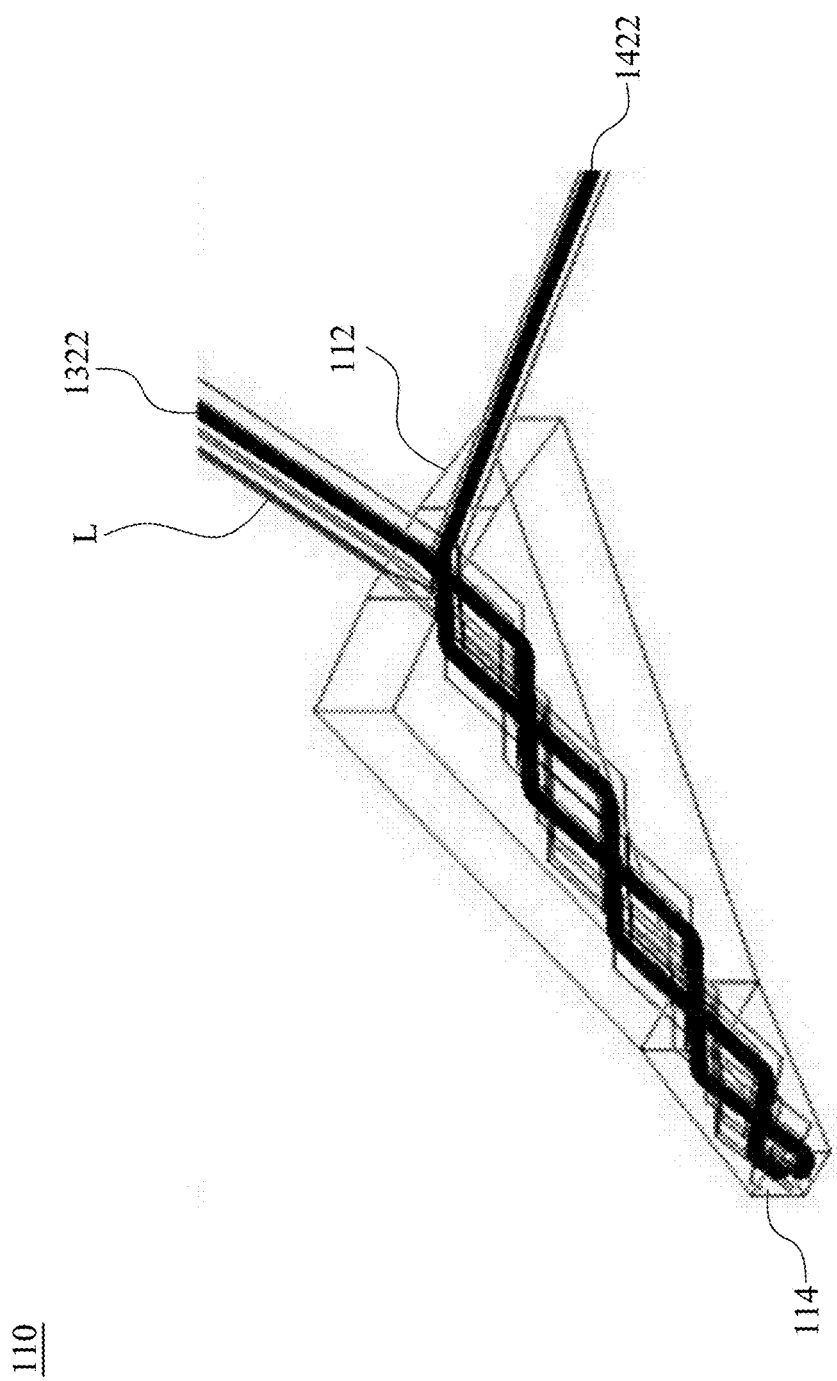
FIG. 2B is a schematic diagram of optical paths in the light guide element of the laser car lamp according to the embodiment illustrated in FIG. 2A.

FIG. 2B is a schematic diagram of optical paths in the light guide element 110 of the laser car lamp 100 according to the embodiment illustrated in FIG. 2A. With reference to FIG. 1, the first laser beam 1322 incident from the above and the second laser beam 1422 incident from below are reflected multiple times in the light guide element 110 and reach the second surface 114, and then being scattered or being excited and scattered by the phosphor element 120 to generate a first scattered light beam and a second scattered light beam. The first scattered light beam and the second scattered light beam are mixed to become a mixed light beam L, and the mixed light beam L is emitted out from the first surface 112 and leaves the light guide element 110.

FIG. 2C is a schematic diagram of beam shape projection on a screen with a distance 25 meters from the lens 150 after the mixed light beam L of the laser car lamp 100 emitting out from the lens 150 according to the embodiment illustrated in FIGS. 2A and 2B. As shown in FIG. 2C, the mixed light beam L of the laser car lamp 100 in some embodiment of the present invention can roughly present the beam shape projection S1 of the first surface 112.

Figure 3A:
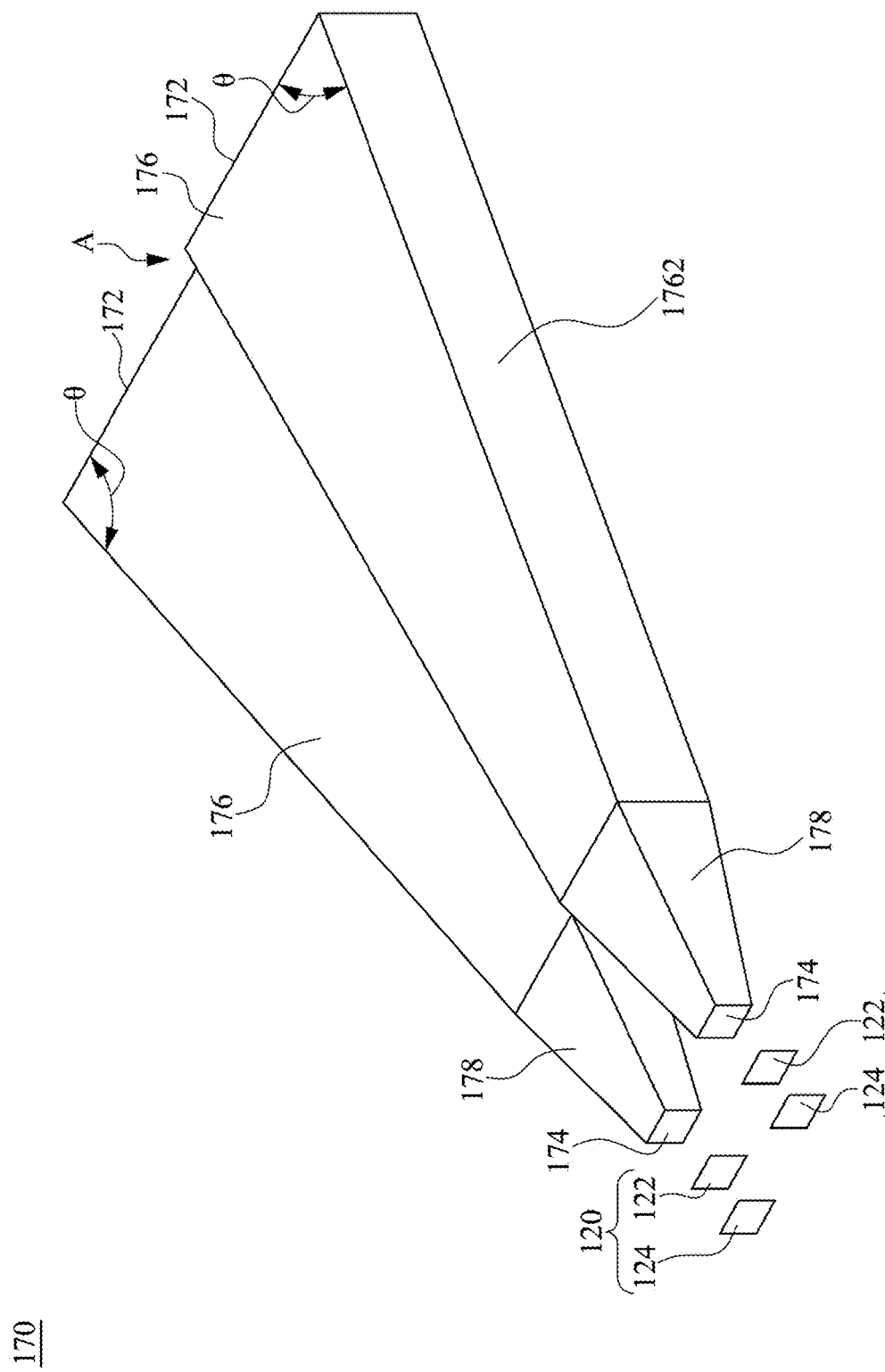
FIG. 3A is a schematic diagram of a light guide element of a laser car lamp according to one embodiment of the present invention.
Figure 3B:
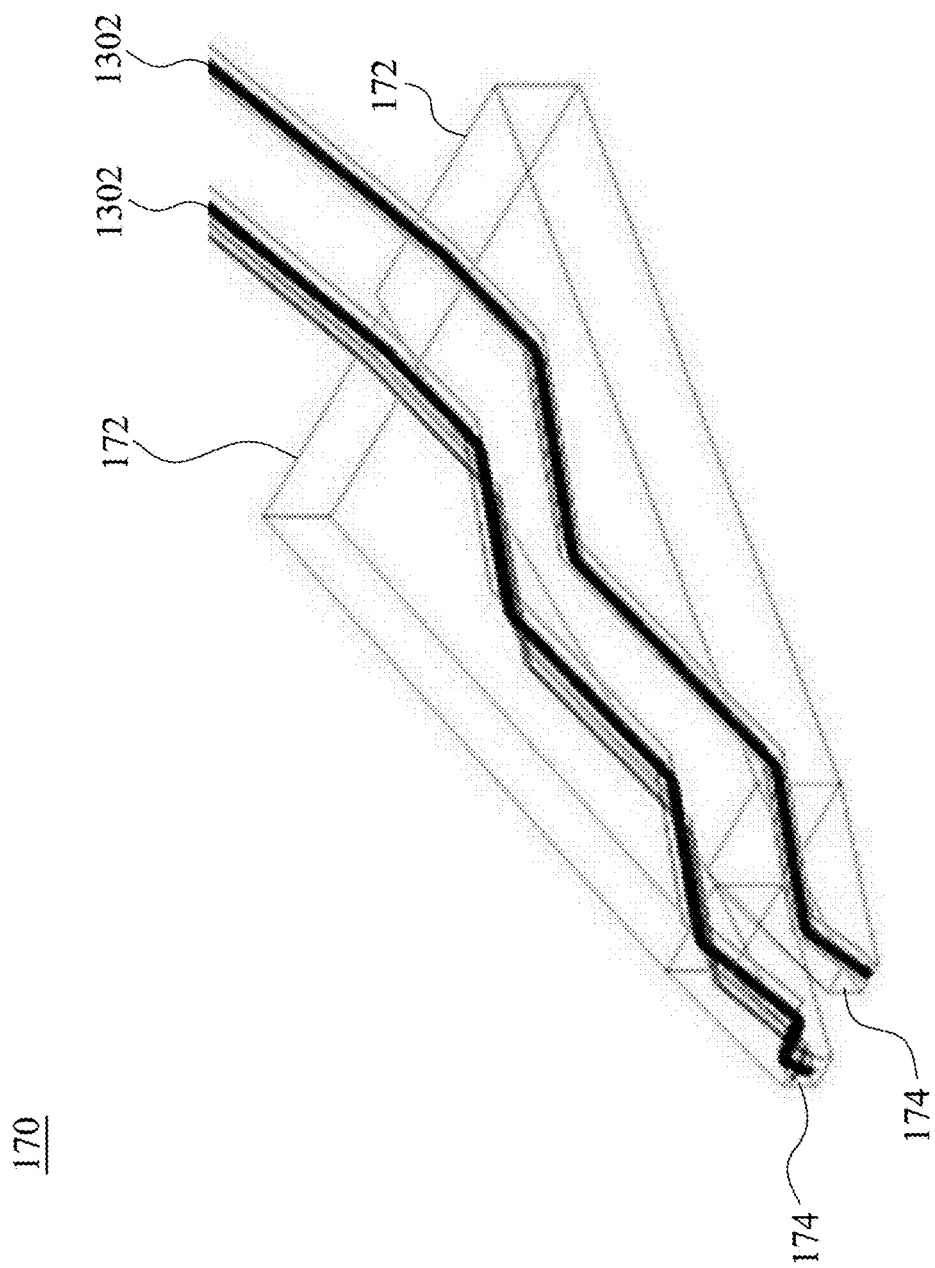
FIG. 3B is a schematic diagram of optical paths in the light guide element of the laser car lamp according to the embodiment illustrated in FIG. 3A.

FIG. 3A is a schematic diagram of a light guide element 170 of a laser car lamp 100 according to one embodiment of the present invention. FIG. 3B is a schematic diagram of optical paths in the light guide element 170 of the laser car lamp 100 according to the embodiment illustrated in FIG. 3A. Referring to FIGS. 3A and 3B. Similar to the embodiment illustrated in FIG. 2A, the light guide element 170 of the laser car lamp 100 in the present embodiment has a first light guide portion 176 and a second light guide portion 178 connected with each other. The first surface 172 is located at the first light guide portion 176, and the second surface 174 is located at the second light guide portion 178. In the present embodiment, the first light guide portion 176 and the second light guide portion 178 are used to facilitate total reflections while the first laser beam 1322 and the second laser beam 1422 is advancing within the first light guide portion 176 and the second light guide portion 178. In addition, the side surface 1762 of the first light guide portion 176 is disposed to have an angle θ smaller than 90 degrees with respect to the first surface 112, such that the cross-sectional area of the first light guide portion 176 is reduced from the first surface 172 toward the second surface 174.

The difference between the embodiment illustrated in FIG. 3A and the embodiment illustrated in 2A is, the second surface 174 is disposed to have two separated second surface 174. The area of the two second surface 174 can be smaller than the area of the second surface 114 in FIG. 2A respectively, so as to enhance illuminating efficiency. The illuminating efficiency herein is the ratio between the total luminous flux emitted and the power consumption of a light source. The two second surfaces 174 can correspond to the first laser beam 1322 generated by the first laser diode 132 and the second laser beam 1422 generated by the second laser diode 142 respectively, or correspond to two first laser beams 1322 generated by the first laser diode 132 respectively, or correspond to two second laser beams 1422 generated by the second laser diode 142 respectively, and not limited thereto. The embodiment illustrated in FIG. 3B exemplifies the two second surface 174 corresponding to two first laser beams 1322 generated by the first laser diode 132 respectively, and is not limited thereto.

Figure 4:
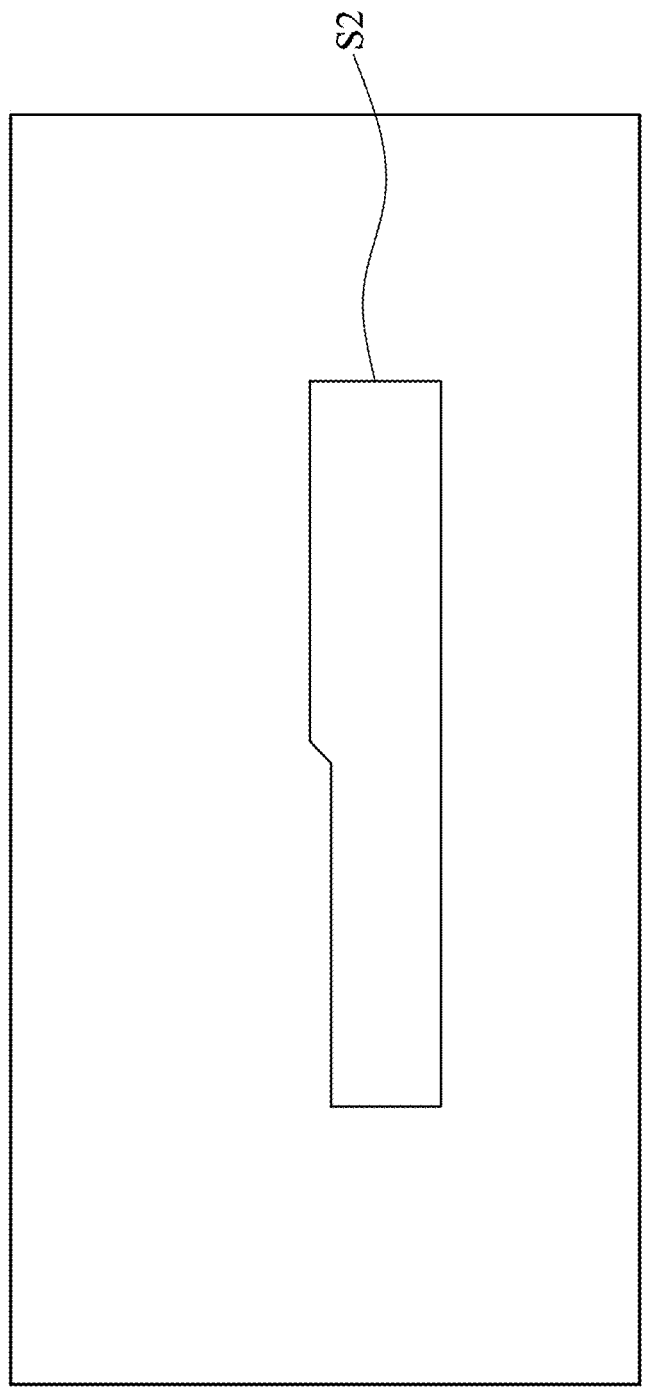
FIG. 4 is a schematic diagram of beam shape projection on a screen with a distance 25 meters from the lens after the mixed light beam of the laser car lamp is emitting out from the lens according to one embodiment of the present invention.

FIG. 4 is a schematic diagram of beam shape projection S2 on a screen with a distance 25 meters from the lens 150 after the mixed light beam L of the laser car lamp 100 emitting out from the lens 150 according to one embodiment of the present invention. Refereeing to FIG. 3A and FIG. 4, the first surface 172 has at least one inner-concave structure A, and the shape of the first surface 172 is inclined-step. The inclined-step shape can be projected and imaged on the screen by the mixed light beam L and the lens 150, and the laser car lamp 100 conforms to current laws and regulations. In addition, the inner-concave structure A may be configured on the first surface 112 in the embodiment illustrated in FIG. 2A, which will not depart from the spirit and scope of the present invention.

Figure 5A:
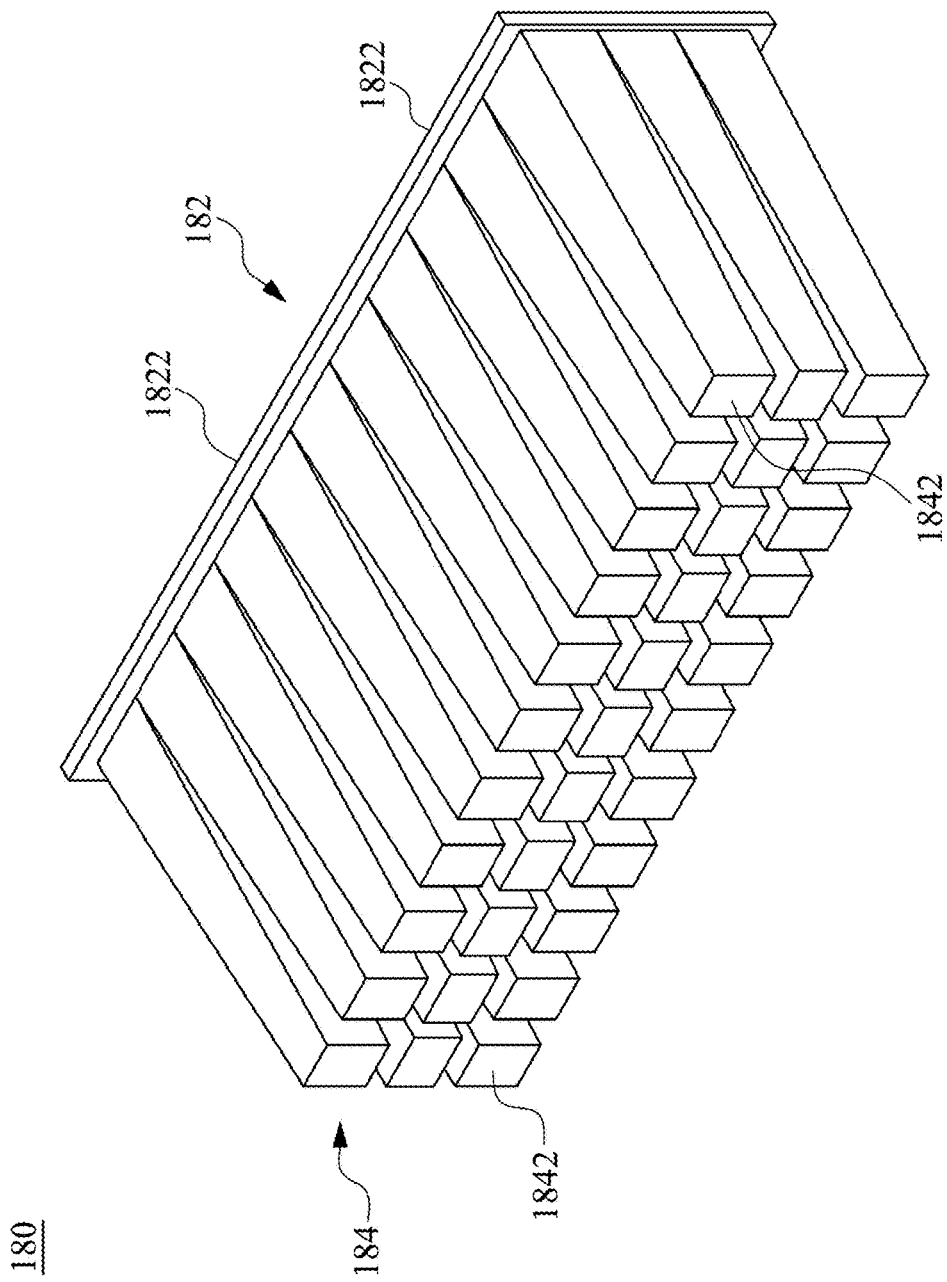
FIG. 5A is a schematic diagram of a light guide element of a laser car lamp according to one embodiment of the present invention.

FIG. 5A is a schematic diagram of a light guide element 180 of a laser car lamp 100 according to one embodiment of the present invention. Similar to the embodiment illustrated in FIG. 2A, the light guide element 180 of the laser car lamp 100 in the present invention has a first surface 182 and a second surface 184. The difference between the embodiment illustrated in FIG. 5A and the embodiment illustrated in FIG. 2A is, in the present embodiment, the second surface 184 comprises a plurality of second sub-surfaces 1842 arranged in an array and isolated from each other, and the first surface 182 comprises a plurality of first sub-surfaces 1822 adjacent to each other and arranged in an array. The plurality of second sub-surfaces 1842 correspond to each of the plurality of first sub-surfaces 1822 respectively. The number of the first laser diodes 132 and the number of the second laser diodes 142 are plural. The plurality of first sub-surfaces 1822 correspond to the plurality of first laser diodes 132 and the plurality of second laser diodes 142 respectively.

Figure 5B:
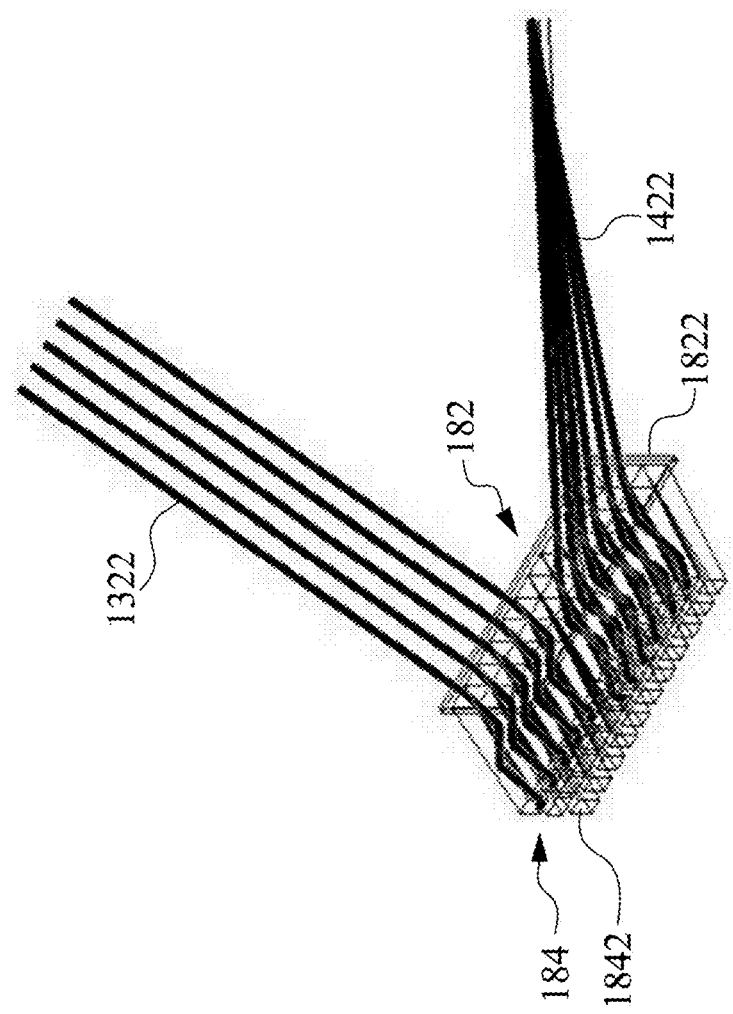
FIG. 5B is a schematic diagram of optical paths in the light guide element of the laser car lamp according to the embodiment illustrated in FIG. 5A.
Figure 5C:
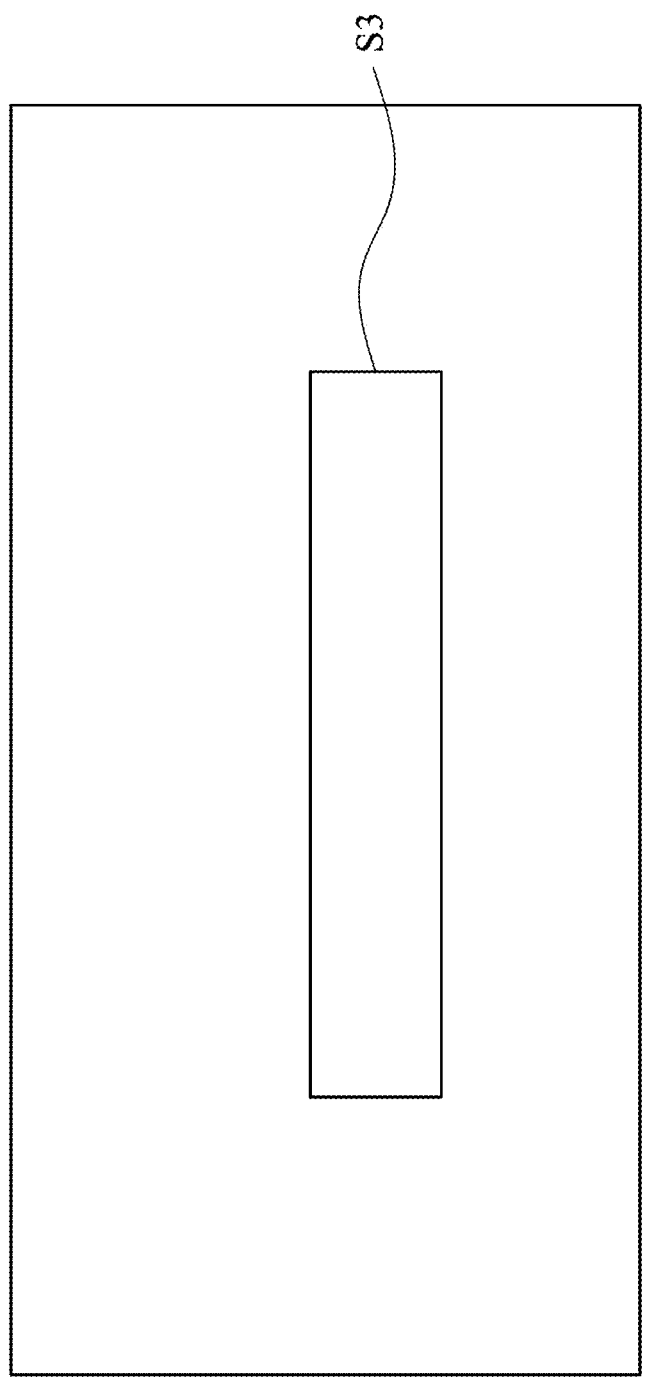
FIGS. 5C to 5F are schematic diagrams of beam shape projection on a screen with a distance 25 meters from the lens after the mixed light beam of the laser car lamp is emitting out from the lens according to one embodiment of the present invention.

FIG. 5B is a schematic diagram of optical paths in the light guide element 180 of the laser car lamp 100 according to the embodiment illustrated in FIG. 5A. Referring to FIG. 5B, in the embodiment of FIG. 5A, the structure of the light guide element 180 is configured for the plurality of first laser beams 1322 generated by the first laser diode 132 and the plurality of second laser beams 1422 generated by the second laser diode 142 and directed to the light guide element 180 through total reflections respectively.

In the present embodiment, since the laser car lamp 100 has a plurality of first laser diodes 132 and second laser diodes 142 corresponding to each other, and a plurality of first surfaces 1822 and second surfaces 1842 corresponding to each other, the first laser beams 1322 and the second laser beams 1422 generated by the first laser diodes 132 and the second laser diodes 142 respectively can be designed to have auto or manual On/Off function, so as to generate different shapes of light in response to environments during the implementation.

Figure 5D:
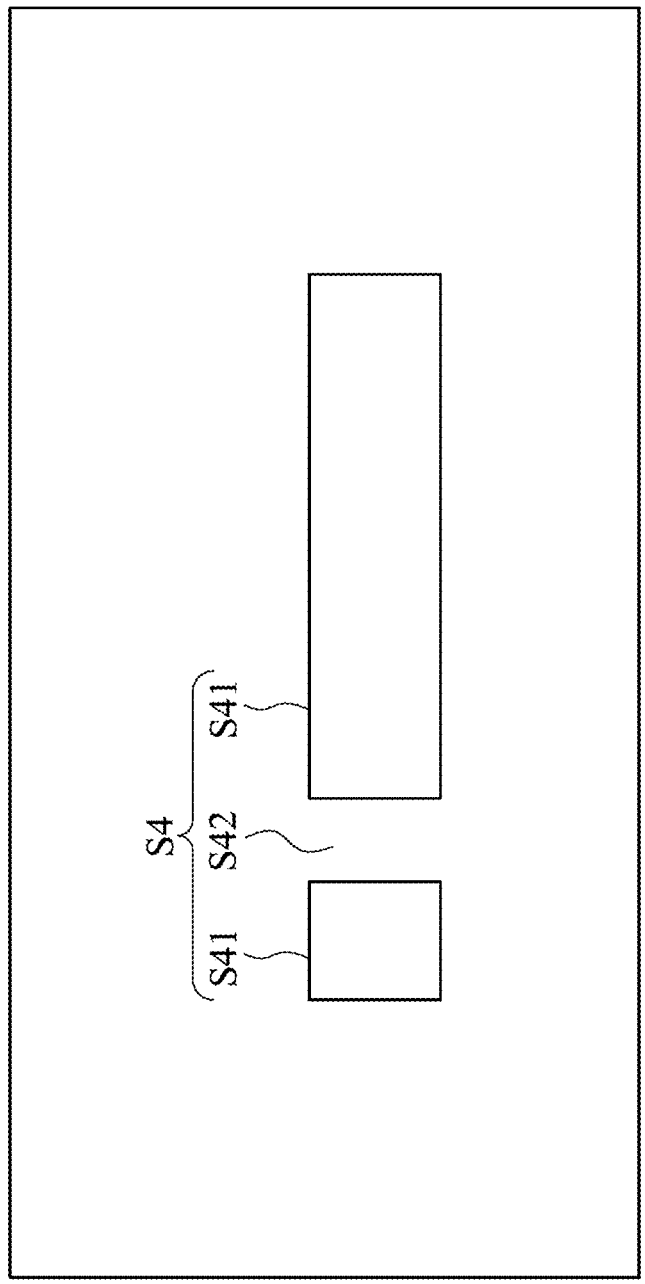
Figure 5E:
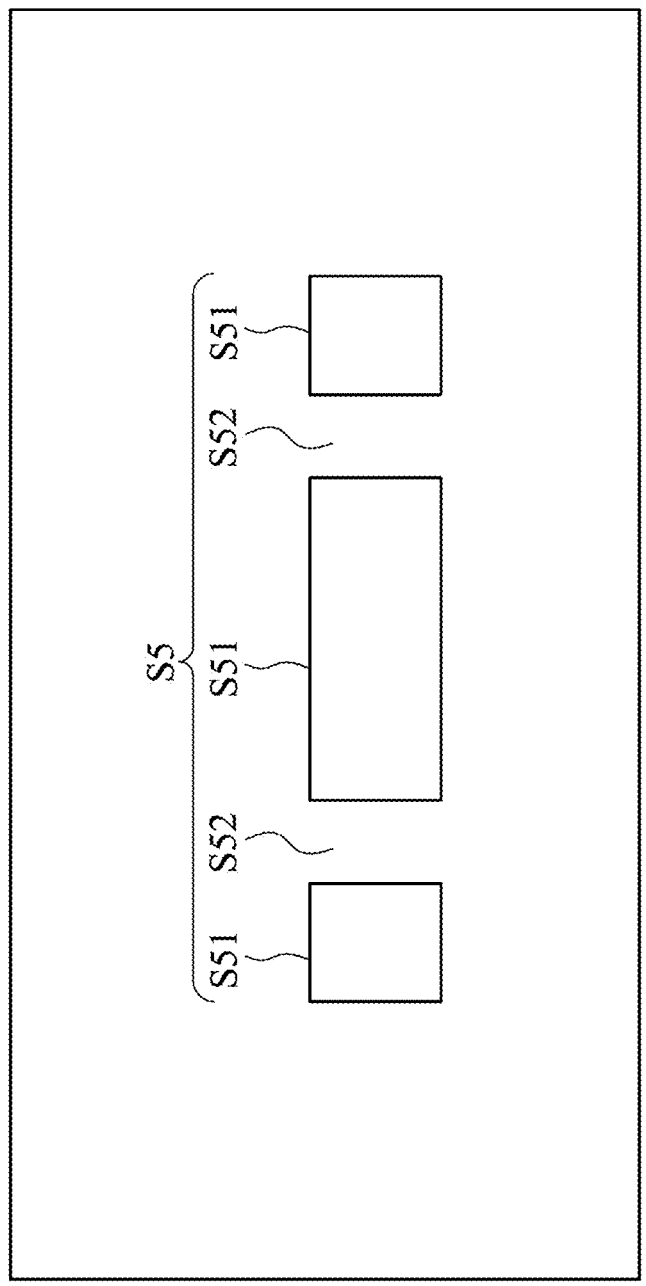
Figure 5F:
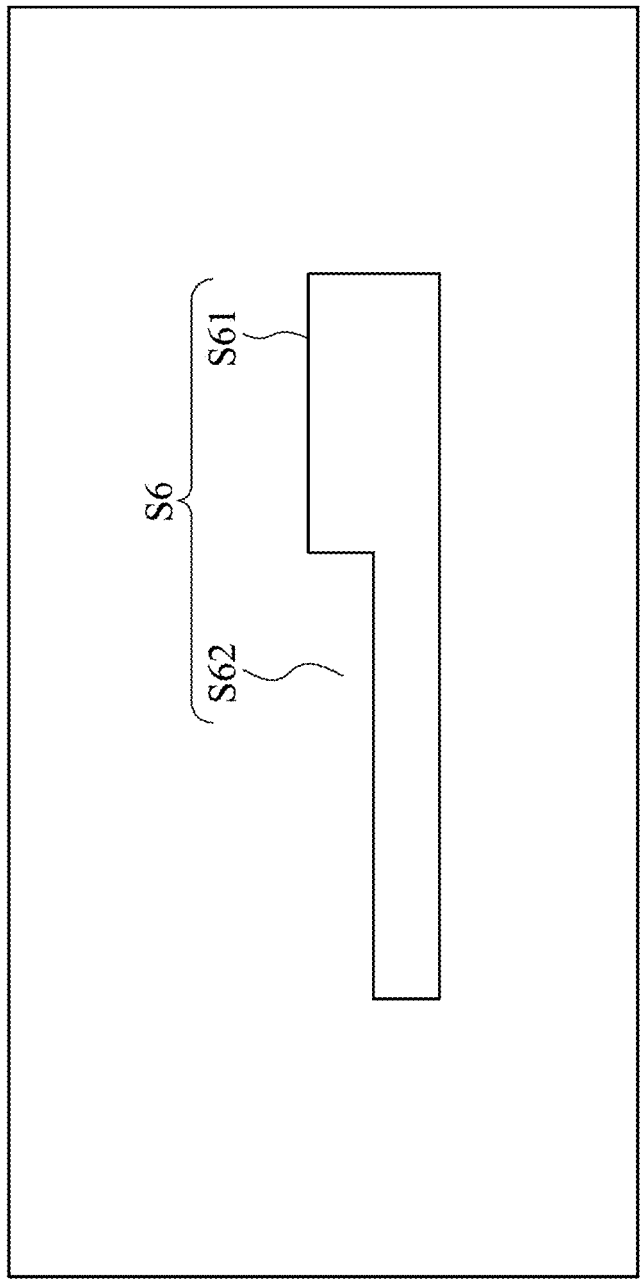

For example, FIGS. 5C to 5F are schematic diagrams of beam shape projection S3, S4, S5, S6 on a screen with a distance 25 meters from the lens 150 after the mixed light beam L of the laser car lamp 100 is emitted out from the lens 150 according to one embodiment of the present invention. In the case where the aforementioned switching function is performed, the light shape of the car lamp may be, for example, the beam shape projection S3 presenting the complete shape of the first surface of FIG. 5C, that is, all the first laser diodes 132 and the second laser diodes 142 are in the on-state. In another case, the first laser diodes 132 and the second laser diodes 142 of the adjacent sub-blocks in FIG. 5D are in an off-state, and the corresponding beam shape projection S4 includes bright portions S41 corresponding to the laser diodes with an on-state, and a dark portion S42 corresponding to the laser diodes with an off-state. In still another case, the first laser diodes 132 and the second laser diodes 142 of plurality of sub-blocks in FIG. 5E are in an off-state, and the corresponding beam shape projection S5 includes bright portions S51 corresponding to the laser diodes with an on-state, and dark portions S42 corresponding to the laser diodes with off-states. In still another case, part of upper rows of the laser diodes in FIG. 5F are in an off-state, and the corresponding beam shape projection S6 includes a bright portion S61 corresponding to the laser diodes with an on-state, and a dark portion S62 corresponding to the laser diodes with an off-state. The part of upper rows may be part of the first laser diodes 132 or part of the second laser diodes 142.

Figure 6:
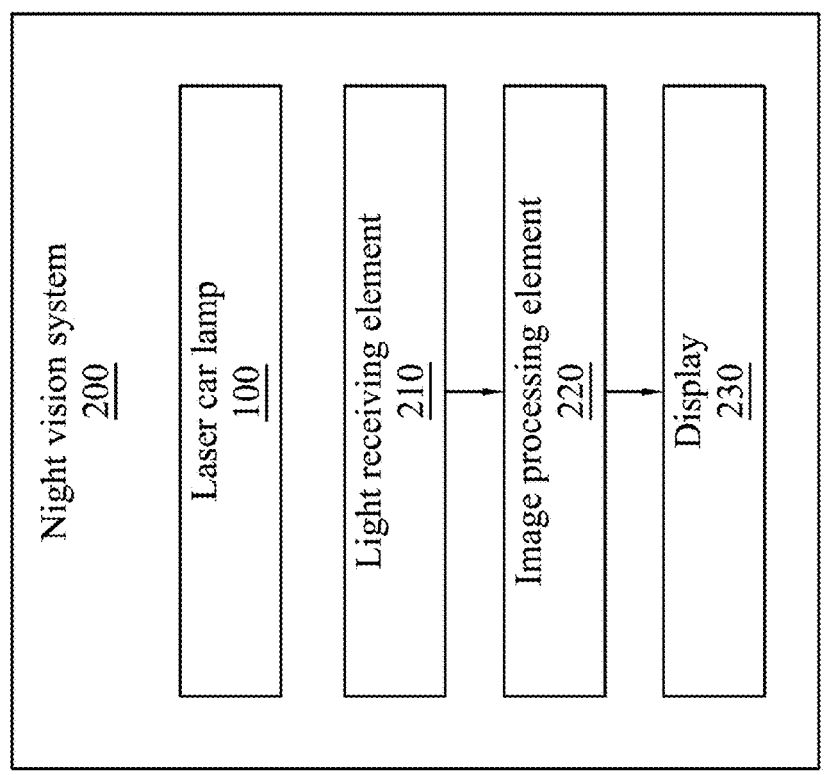
FIG. 6 is a night vision system according to one embodiment of the present invention.

In another aspect, the laser car lamp 100 of the present invention may combine with a night vision system 200 to assist night recognitions for drivers. FIG. 6 is a night vision system 200 according to one embodiment of the present invention. In the present embodiment, besides the laser car lamps 100 illustrated in various embodiments mentioned above, the night vision system 200 further includes a light receiving element 210, an image processing element 200, and a display 230. The image processing element 220 is electrically connected to the light receiving element 210, and the display 230 is electrically connected to the image processing element 220. The light receiving element 210 receive the reflected light which is reflected back to the night vision system 200 after the mixed light beam is emitted out from the lens, and the reflected light is converted into a plurality of electrical signals by the light receiving element 210. Then, the image processing element 220 processes the electrical signals and transmits them to the display to produce an image.

In summary, the laser car lamps and the night vision system disclosed in some embodiments of the present invention utilize the first laser diodes which emits infrared laser beams and the second laser diode which emits blue laser beams, the light guide element, and the phosphor element to generate a mixed light beam which mixes infrared beams and visible white light beams. This kind of mixed light beam used in the lighting of car lamps can have both characteristics of the remote detection of infrared light and the human eyes recognition of visible light with no need to add optical components, and thus reducing the size of the laser car lamp and saving the costs. In addition, the light guide element having reduced structures enhances the light receiving and exiting efficiency, and can also decrease astigmatism of the mixed light beam while exiting, so as to maintain the light shape of the first surface. Furthermore, by controlling the switches of the plurality of laser diodes which correspond to one another, or adjusting the shapes of the first surface and the second surface, the laser car lamp can produce different light shapes in response to different design inquiries.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A laser car lamp, comprising:
   a light guide element having at least a first surface and at least a second surface opposite to the first surface;
   at least a phosphor element disposed at an end of the second surface of the light guide element;
   at least one first laser diode;
   at least one second laser diode;
   a lens disposed at an end of the first surface of the light guide element; and
   at least one reflector configured to reflect the first laser beam generated by the first laser diode and reflect the second laser beam generated by the second laser diode to the first surface,
   wherein the first laser beam is scattered by the phosphor element to form a first scattered light, the second laser beam is excited and scattered by the phosphor element to form a second scattered light, and a mixed light beam including the first scattered light beam and the second scattered light beam is emitted from the first surface toward the lens.

2. The laser car lamp of claim 1, wherein the first laser beam is a near infrared laser beam, and the second laser beam is blue laser beam.

3. The laser car lamp of claim 1, wherein the light guide element has a first light guide portion and a second light guide portion connected with each other, the first surface is located at the first light guide portion, and the second surface is located at the second light guide portion.

4. The laser car lamp of claim 3, wherein the cross-sectional area of the first light guide portion is reduced from the first surface toward the second surface.

5. The laser car lamp of claim 4, wherein the cross-sectional area of the second light guide portion is reduced from a direction of the first surface toward the second surface.

6. The laser car lamp of claim 5, wherein a reduced amount per unit distance of the cross-sectional area of the first light guide portion along the direction is greater than a reduced amount per unit distance of the cross-sectional area of the second light guide portion along the direction.

7. The laser car lamp of claim 1, wherein the first surface has at least one inner-concave structure, and the shape of the first surface is inclined-step.

8. The laser car lamp of claim 1, wherein the second surface comprises a plurality of second sub-surfaces arranged in an array and isolated from each other, and the first surface comprises a plurality of first sub-surfaces adjacent to each other and arranged in an array, wherein the second sub-surfaces correspond to each of the first sub-surfaces respectively, the number of the at least one first laser diode and the at least one second laser diode is plural, and the first sub-surfaces correspond to the first laser diodes and the second laser diodes.

9. The laser car lamp of claim 1, wherein the phosphor element comprises a phosphor powder layer and a reflecting layer.

10. A night vision system, comprising:
   the laser car lamp as claimed in claim 1;
   at least one light receiving element;
   an image processing element electrically connected to the light receiving element; and
   a display, electrically connected to the image processing element,
   wherein the light receiving element receive the reflected light reflected back to the night vision system after the mixed light beam is emitted, and the reflected light are converted into a plurality of electrical signals by the light receiving elements, the image processing element processes the electrical signals and transmits the electrical signals to the display to produce an image.

* * * * *